July 16, 1935.  S. WILTSE  2,008,534

TUBING

Filed Feb. 12, 1930

INVENTOR
Sumner Wiltse.
BY
Harness, Dickey, Pierce & Hann
ATTORNEYS.

Patented July 16, 1935

2,008,534

UNITED STATES PATENT OFFICE 2,008,534

TUBING

Sumner Wiltse, Detroit, Mich.

Application February 12, 1930, Serial No. 427,875

7 Claims. (Cl. 137—75)

This invention relates to fluid conducting tubing.

The main objects of this invention are to provide an improved construction of tubing particularly suitable for use where it is subjected to considerable vibration, such as the fuel and oil lines of airplane motors and the like; to provide an improved construction of tubing in which the vibration is substantially lessened or dampened; to provide a fluid conducting tubing which upon structural failure or rupture will not put the line entirely out of service, but continue to supply fluid therethrough, and to provide an improved construction in which any leaks or other failures may be readily and visually located.

An illustrative embodiment of this invention is shown in the accompanying drawing, in which.

At the present time the greatest number of failures in airplane flying are being caused by fuel lines and oil lines being split or broken by reason of the vibration to which they are subjected. Disastrous results are many times the result of structural failures, not only because of the inevitable forced landing, but particularly if it is a failure of the fuel line the gasoline leaking out through a split or break oftentimes catches fire, thus enveloping the entire machine in flames, causing an explosion of the gasoline tank with the consequent complete destroying of the machine and appalling loss of life.

Annealed copper tubing is universally used at the present time for the fuel and oil lines of airplane engines, and my improved invention consists in adding to this annealed copper tubing certain coverings of fabric and rubber which perform two useful functions.

The first function performed is by the covering of the tubing, damping or reducing the vibration of the tube very materially. The second function performed is that in the event of a split, break or other structural failure of the tubing, only a small amount of the fluid passing therethrough will leak out and an adequate and sufficient supply of the fluid will continue to pass to the engine even though the copper tube should become entirely broken in two parts.

Figure 1:
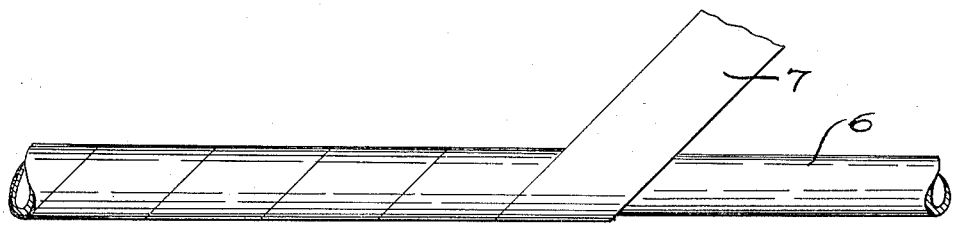
Fig. 1 is a view in elevation of the tubing during its first manufacturing operation.

In the construction shown in the drawing a length of annealed copper tubing 6, is covered with fabric, preferably of the friction type, by winding a strip of adhesive tape 7, or the like, helically about the tube as shown in Fig. 1 of the drawing. Ordinary electricians' friction tape is quite suitable for this purpose, particularly inasmuch as both sides of this kind of tape have adhesive material thereon.

The fabric covered tube is then provided with a tight fitting sleeve 8 of yielding or elastic material such as rubber, which under normal or unstressed conditions has a smaller inside diameter than the outside diameter of the fabric covered tube.

Figure 2:
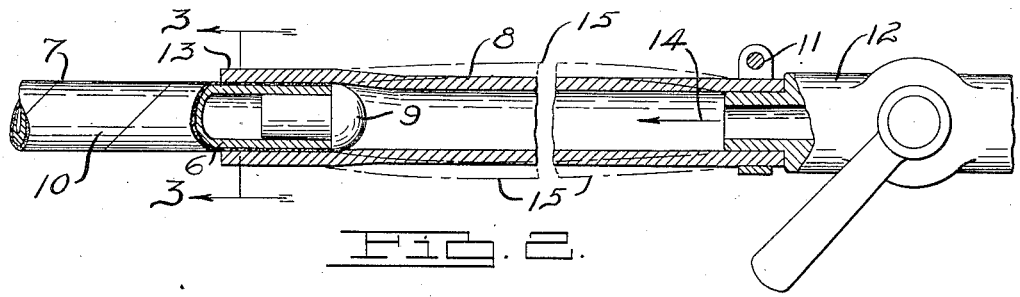
Fig. 2 is a view partly in elevation and partly in section, during the second manufacturing operation.
Figure 3:
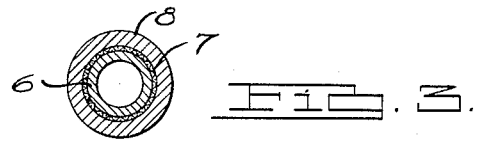
Fig. 3 is a sectional view taken on the line 3—3 of Fig. 2, looking in the direction indicated by the arrows.
Figure 4:
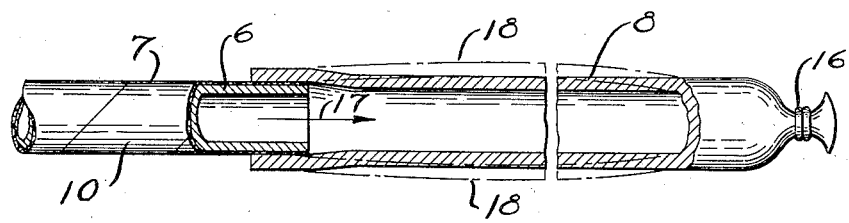
Fig. 4 is a view partly in elevation and partly in section, of a modified method of putting the outer covering on the tube.

The rubber cover may be assembled onto the fabric covered tube in either one of two different ways, as shown in Figs. 2 and 4 of the drawing. In the embodiment shown in Fig. 2, a round headed plug 9 is placed in the end of the fabric covered tube, designated 10 in this view. The rubber tube 8 is secured by a clamp 11 to the discharge end of an air valve 12, which communicates with a suitable source of air under pressure.

The outer end 13 of the rubber tube 8 is grasped by one hand of the workman and the fabric covered tube 10, held by the opposite hand, and abutted against the open end of the tube. At this time the air valve 12 is opened so that the air flows out into tube 8, as shown by the arrow 14. By reason of the plug 9 being abutted tightly against the end of tube 10, the air being introduced into the rubber tubing will cause it to stretch and swell as shown by the dotted line 15, thus permitting the tube 10 to be readily inserted within the rubber covering 8. The air valve 12 is then closed and the elasticity of the rubber tube 8 will cause it to tightly grip the outside of the fabric covered tube 10.

In the method shown in Fig. 4 of the drawing one end of the rubber tubing 8 is tied by a cord 16 so that air cannot escape therefrom. The fabric covered tube 10 is connected to a source of air under pressure so that the air will flow through the tubing 6, as shown by the arrow 17. The end of the tube 10 is then abutted against the open end of the rubber tube 8, causing it to stretch and swell as shown by the dotted line 18, at which time the tube 10 may be readily inserted within its rubber cover. During the insertion of the tube in both instances air will be continually escaping around the outer side of the fabric covered tube, thus keeping the rubber tube 8 in loosely spaced relation to the tube 10 until it has been fully inserted therein.

Figure 5:
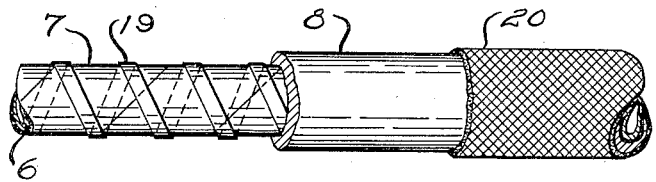
Fig. 5 is a view showing a modified form of constructing the product.

In the modification shown in Fig. 5, the general structure is strengthened and improved by helically winding a metallic ribbon 19 about the tube after the fabric 7 has been wound thereon. This ribbon may be 1/8 inch copper ribbon with two or three convolutions per inch if desired. After the elastic rubber covering 8 has been assembled upon the tube a knitted fabric outer covering 20 may be placed thereover, so as to protect the rubber from cuts, bruises and other injuries.

In the operation of this tubing the fabric and rubber covers being closely associated to the copper, and tightly gripping same, will tend to dampen or lessen vibration of the tubing to a very material extent.

However, in the event of any structural failure such as a split or a crack in the tube, gasoline or oil leaking through such a rupture will percolate through the fabric covering to a slight extent and when such fluid contacts with the rubber covering 8, it will cause the rubber to swell at that point due to the solubility of rubber in petroleum distillates or the chemical action between them. Such swelling of the rubber will, of course, be readily discernible to the eye, thus facilitating inspection of the fluid lines of the airplane or the like, even though the rupture may be of such slight character that if it occurred on bare tubing as heretofore used, gasoline leaking therethrough would be immediately evaporated by the atmosphere, and such leak would not be discernible to the inspector. Where the fabric cover 20 is employed, it may prevent visible swelling of the rubber, but the fuel or oil, as the case may be, will seep through the fabric and will discolor it so as to make the leak easily discernible.

Although but one specific embodiment and one modification of this invention have been herein shown and described, it will be understood that other details of the construction may be altered or omitted without departing from the spirit of this invention, as defined by the following claims:

1. A fluid conducting line comprising a metallic tube, a strip of adhesive fabric helically wound around said tube, a metallic ribbon helically wound around said fabric covered tube, and a covering of rubber surrounding said tube, fabric and ribbon.

2. A fluid conducting line comprising a metallic tube, a strip of adhesive fabric helically wound around said tube, a metallic ribbon helically wound around said fabric covered tube, a covering of rubber surrounding said tube, fabric and ribbon, and an outer covering of woven fabric surrounding said rubber covering.

3. A rubber-covered flexible metal tube comprising an inner seamless flexible metal tube having a continuous unbroken wall, a thin fabric covering cemented to the outer surface of said tube and a preformed rubber tube placed over and cemented to said fabric-covered metal tube.

4. A liquid fuel or oil conducting line for connection with a source of supply at one end and to an internal combustion engine at the other, said conducting line comprising a metal tube and a rubber covering therefor, said tube and covering being so proportioned whereby any leak in the tube, due to rupture of the wall thereof, will cause the rubber covering to swell upon contact with the fuel or oil leaking through the rupture and thereby form a visual indication at the point of the rupture.

5. A liquid fuel or oil conducting line for connection with a source of supply at one end and to an internal combustion engine at the other, said conducting line comprising a metal tube and a rubber covering therefor, means for bonding the covering to the tube, said tube and covering being so proportioned whereby any leak in the tube due to rupture of the wall thereof will cause the rubber covering to swell upon contact with the fuel or oil leaking through the rupture and thereby form a visual indication at the point of rupture.

6. A liquid fuel or oil conducting line for connection with a source of supply at one end and to an internal combustion engine at the other, said conducting line comprising a metal tube and a rubber covering therefor, said rubber covering normally having a smaller inside diameter than the outside diameter of the metal tube so that the rubber tube is in stretched relation therearound, said tube and covering being so proportioned whereby any leak in the tube due to rupture of the wall thereof will cause the rubber covering to swell upon contact with the fuel or oil leaking through the rupture and thereby form a visual indication at the point of rupture.

7. A liquid fuel or oil conducting line for connection with a source of supply at one end and to an internal combustion engine at the other, said conducting line comprising an inner tube of a material insoluble in petroleum distillates and an outer covering surrounding said tube comprising material soluble in petroleum distillates, said tube and covering being so proportioned whereby any leak in the tube due to rupture of the wall thereof will cause the covering to swell upon contact with the fuel or oil leaking through the rupture and thereby form a visual indication at the point of the rupture.

SUMNER WILTSE.